(12) United States Patent
Thiebaut-George

(10) Patent No.: US 8,195,645 B2
(45) Date of Patent: Jun. 5, 2012

(54) OPTIMIZED BULK COMPUTATIONS IN DATA WAREHOUSE ENVIRONMENTS

(75) Inventor: Eric Thiebaut-George, Donnybrook (IE)

(73) Assignee: International Business Machines Corporation, Armonk, NY (US)

( * ) Notice: Subject to any disclaimer, the term of this patent is extended or adjusted under 35 U.S.C. 154(b) by 986 days.

(21) Appl. No.: 12/178,247

(22) Filed: Jul. 23, 2008

(65) Prior Publication Data

US 2010/0023477 A1   Jan. 28, 2010

(51) Int. Cl.
*G06F 17/30* (2006.01)

(52) U.S. Cl. ........ 707/715; 707/716; 707/638; 707/660; 707/686

(58) Field of Classification Search .............. 707/715, 707/716, 638, 639, 640, 660, 686; 706/45, 706/46, 50, 61
See application file for complete search history.

(56) References Cited

U.S. PATENT DOCUMENTS

| | | | |
|---|---|---|---|
| 5,742,806 A | 4/1998 | Reiner et al. | |
| 5,778,375 A | 7/1998 | Hecht | |
| 5,903,893 A | 5/1999 | Kleewein et al. | |
| 6,088,659 A * | 7/2000 | Kelley et al. | 709/201 |
| 6,199,068 B1 * | 3/2001 | Carpenter | 707/715 |
| 6,286,005 B1 * | 9/2001 | Cannon | 705/14.66 |
| 6,327,587 B1 | 12/2001 | Forster | |
| 6,484,179 B1 | 11/2002 | Roccaforte | |
| 6,546,381 B1 | 4/2003 | Subramanian et al. | |
| 6,594,653 B2 | 7/2003 | Colby et al. | |
| 6,718,320 B1 | 4/2004 | Subramanian et al. | |
| 7,082,433 B2 | 7/2006 | Anonsen et al. | |
| 7,149,733 B2 | 12/2006 | Lin et al. | |
| 7,263,520 B2 | 8/2007 | Biedenstein et al. | |
| 7,480,493 B1 * | 1/2009 | Sud | 455/104 |
| 7,747,563 B2 * | 6/2010 | Gehring | 707/602 |
| 2006/0004786 A1 * | 1/2006 | Chen et al. | 707/801 |
| 2006/0238919 A1 | 10/2006 | Bradley | |
| 2007/0011183 A1 | 1/2007 | Langseth et al. | |
| 2007/0094233 A1 | 4/2007 | Otter et al. | |
| 2007/0094236 A1 | 4/2007 | Otter et al. | |
| 2008/0208784 A1 * | 8/2008 | Hill et al. | 706/46 |
| 2009/0313041 A1 * | 12/2009 | Eder | 705/2 |

* cited by examiner

*Primary Examiner* — Shahid Alam
(74) *Attorney, Agent, or Firm* — Cantor Colburn LLP; Jeffery LaBaw

(57) ABSTRACT

A method including extracting data spanning a computational interval from a plurality of database tables in an optimized manner, creating an array of each column of data that is extracted, accessing each array via a standardized programmatic interface to manipulate the data, if needed to perform computations, normalizing the accessed data to a common interval or interpolating the accessed data to derive missing items based on the common interval, performing the computations on the accessed data, and outputting results of the computations to a storage medium or an output device. A corresponding system and computer program product.

11 Claims, 3 Drawing Sheets

OPTIMIZED BULK COMPUTATIONS IN DATA WAREHOUSE ENVIRONMENTS

BACKGROUND

This invention relates generally to database management, and particularly to optimized bulk computations in data warehouse environments.

Data warehouse systems are used to store and manage data for many purposes, such as financial, goods and services, governmental, medical, and technological industries for local, national, and global applications. For example, data warehouse systems are often used to store and manage performance data, such as wireless network performance data. Some data warehouse systems, such as performance management systems, utilize bulk computations in order to accelerate queries and reports. These computations usually pre-summarize data across several dimensions, such as time and primary key. Some computations may also involve data residing in different database tables of one or more databases and, therefore, involve joining different tables in order to derive data. Sometimes, missing or incorrect computed values can result from unexpected events, such as late or missing data or data received at different rates, which does not join using standard database techniques.

BRIEF SUMMARY

Optimized bulk computations in data warehouse environments are provided. An exemplary method embodiment includes extracting data spanning a computational interval from a plurality of database tables in an optimized manner, creating an array of each column of data that is extracted, accessing each array via a standardized programmatic interface to manipulate the data, if needed to perform computations, normalizing the accessed data to a common interval or interpolating the accessed data to derive missing items based on the common interval, performing the computations on the accessed data, and outputting results of the computations to a storage medium or an output device. A corresponding system embodiment and computer program product embodiment is also provided.

Additional features and advantages are realized through the techniques of the present invention. Other embodiments and aspects of the invention are described in detail herein and are considered a part of the claimed invention. For a better understanding of the invention with advantages and features, refer to the description and to the drawings.

BRIEF DESCRIPTION OF THE SEVERAL VIEWS OF THE DRAWINGS

The subject matter that is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

The detailed description explains the preferred embodiments of the invention, together with advantages and features, by way of example with reference to the drawings.

DETAILED DESCRIPTION

According to exemplary embodiments of the invention described herein, optimized bulk computations in data warehouse environments are provided. In accordance with such exemplary embodiments, bulk computations are performed in data warehouse environments in an optimal manner that minimizes the needed memory, processing, time, and input/output. Furthermore, for each iterative and/or recursive performance, the computations have a constant memory cost ($O(1)$) and a linear time and CPU cost ($O(n)$) (where n is the number of rows to process).

Figure 1:
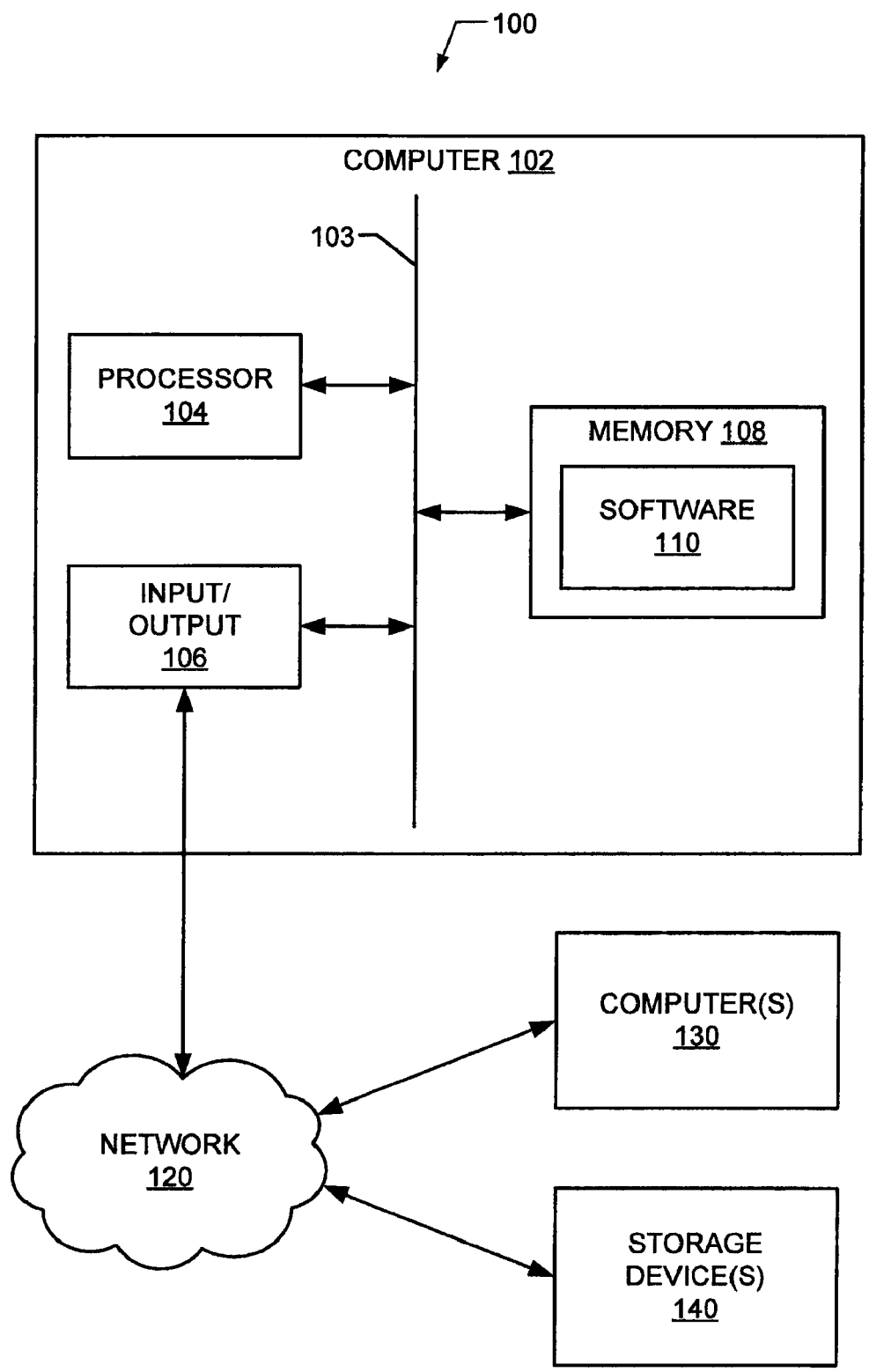
FIG. 1 is a block diagram illustrating an example of a computer system including an exemplary computing device configured to provide optimized bulk computations in data warehouse environments.

Turning now to the drawings in greater detail, wherein like reference numerals indicate like elements, FIG. 1 illustrates an example of a computer system 100 including an exemplary computing device ("computer") 102 configured to provide optimized bulk computations in data warehouse environments. In addition to computer 102, exemplary computer system 100 includes network 120, computing device(s) ("computer(s)") 130, and storage device(s) 140. Network 120 connects computer 102, computer(s) 130, and storage device(s) 140 and may include one or more wide area networks (WANs) and/or local area networks (LANs) such as the Internet, intranet(s), and/or wireless communications network(s). Computer(s) 130 may include one or more other computers, e.g., that are similar to computer 102 and which, e.g., may operate as a server device, client device, etc. within computer system 100. Storage device(s) 140 may include one or more other computing devices that provide data warehouses and/or other data storage environments. In some embodiments, storage device(s) may also (or alternatively) be directly linked to computer 102 and/or computer(s) 130, e.g., via a physical internal link or a dedicated external link. Computer 102, computer(s) 130, and data storage device(s) 140 are in communication via network 120, e.g., to communicate data between them.

Exemplary computer 102 includes processor 104, input/output component(s) 106, and memory 108, which are in communication via bus 103. Processor 104 may include multiple (e.g., two or more) processors, which may, e.g., implement pipeline processing, and may also include cache memory ("cache") and controls (not depicted). Furthermore, processor 104 may include advanced instruction sets that can operate on multiple data at the same time to facilitate optimized bulk computations in data warehouse environments as further described below (e.g., normalization, interpolation, computation, etc.). The cache may include multiple cache levels (e.g., L1, L2, etc.) that are on or off-chip from processor 104 (e.g., an L1 cache may be on-chip, an L2 cache may be off-chip, etc.). Input/output component(s) 106 may include one or more components that facilitate local and/or remote input/output operations to/from computer 102, such as a display, keyboard, modem, network adapter, ports, etc. (not depicted). Memory 108 includes software 110 configured to provide optimized bulk computations in data warehouse environments, which is executable, e.g., by computer 102 via processor 104. Memory 108 may include other software, data, etc. (not depicted).

Figure 2:
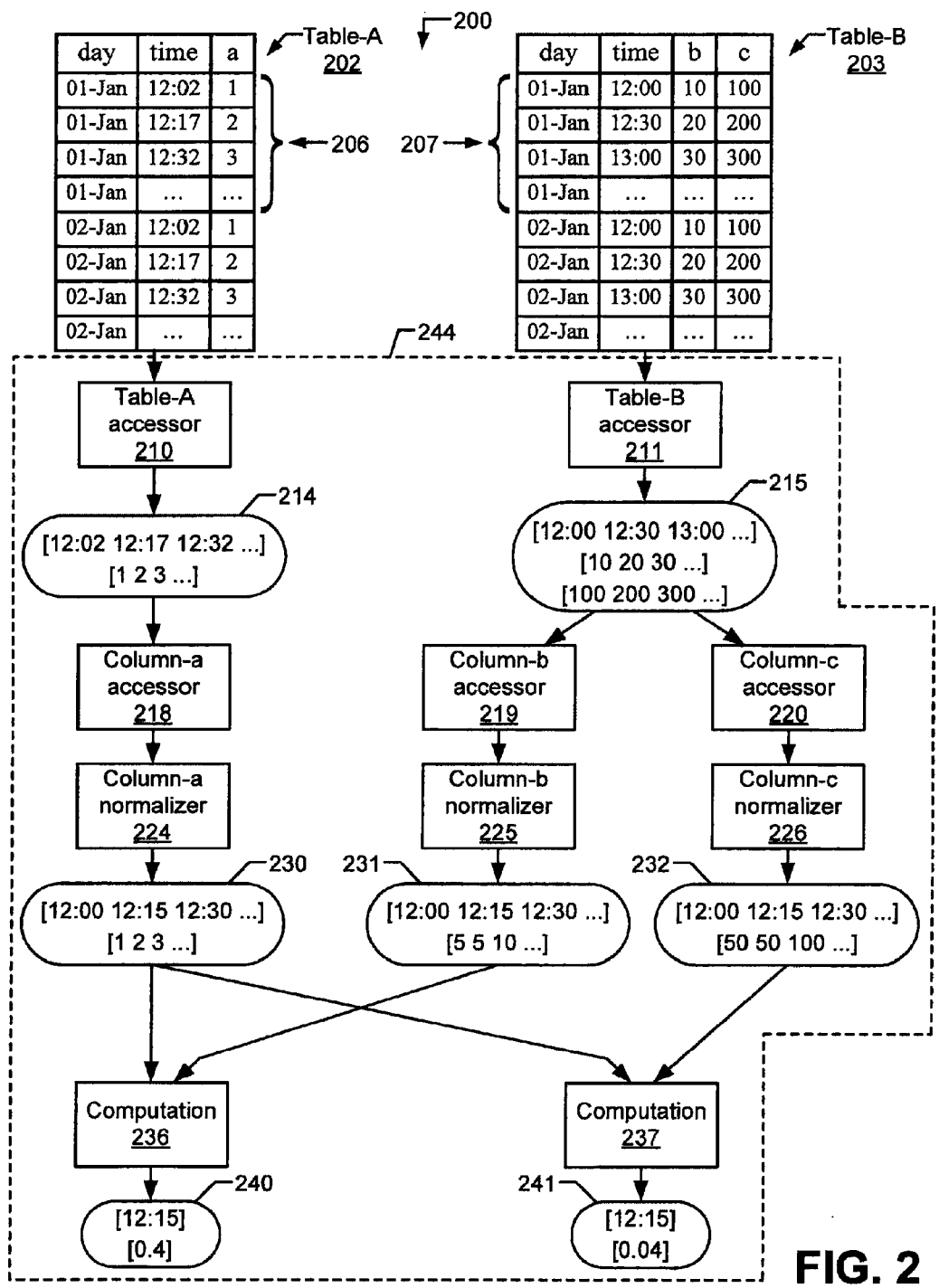
FIG. 2 is a block diagram illustrating an example of a computer software architecture, including exemplary data flow, configured to provide optimized bulk computations in data warehouse environments that is operable, e.g., on the exemplary computing device of FIG. 1.

FIG. 2 illustrates an example of a computer software architecture 200, including exemplary data flow, configured to provide optimized bulk computations in data warehouse environments that is operable, e.g., on the exemplary computer 100 of FIG. 1 (e.g., via software 110). The exemplary architecture 200 includes table accessor logic 210, 211, which is configured to extract data spanning a computational interval from one or more database tables (e.g., from one or more storage device(s) 140) in an optimized manner, such as a table scan, a partition scan, or a covering index scan (although other methods, including more complex methods, are also possible such as a structured query language "SQL" query), and configured to create an array of each column of data that is extracted. The data is extracted, e.g., to perform computations (e.g., in advance, on a routine basis, etc.) to respond to computation requests (e.g., user queries). In some embodiments, the computational interval may be a primary key interval and/or a time span interval. For example, table-A accessor 210 extracts data spanning a computational interval 206, such as an hour, day (as depicted), week, month, year, etc., from table-A 202 and creates output 214 containing an array of each column of the extracted data (in this example, from the "time" column and the "a" column). Similarly, table-B accessor 211 extracts data spanning computational interval 207 from table-B 203 and creates output 215 containing an array of each column of the extracted data (in this example, from the "time" column, the "b" column, and the "c" column).

Table accessor logic 210, 211 is in communication with column accessor logic 218, 219, 220, which is configured to access each array (e.g., in output 214, 215) as a standardized programmatic interface to manipulate the data. Column accessor logic 218, 219, 220 is in communication with column normalizer logic 224, 225, 226, which is configured to normalize the accessed data to a common interval if needed to perform computations on the data. In some embodiments, column normalizer logic 224, 225, 226 is configured to normalize the accessed data by performing at least one of a function of summing, subtracting, multiplying, dividing, computing a minimum, computing a maximum, or copying on the accessed data to rebase the data to a common primary key interval and/or a common time span interval. For example, data in output 214 is based on a fifteen minute time span interval starting at 12:02 each day and data in output 215 is based on a thirty minute time span interval starting at 12:00 each day. In this example, column normalizer logic 224, 225, 226 may be configured to rebase the data from outputs 214, 215 to a common fifteen minute time span interval starting at 12:00 each day. Thus, column-a normalizer logic 224 may be configured to compute a maximum of the column-a data from 12:00 to 12:02 (e.g., max(0,1)=1 for 12:00), from 12:02 to 12:17 (e.g., max(1,2)=2 for 12:15), and from 12:17 to 12:32 (e.g., max(2,3)=3 for 12:30) to rebase the data to the common time span interval resulting in output 230. Furthermore, column-b normalizer logic 225 and column-c normalizer logic 226 may be configured to divide the column-b data and column-c data in half, respectively, from 12:00 to 12:30 (e.g., 10/2=5, 100/2=50 for 12:00; 10/2=5, 100/2=50 for 12:15; 20/2=10, 200/2=100 for 12:30) to rebase the data to the common time span interval resulting in outputs 231, 232. Generally, the configuration of column normalizer logic 224, 225, 226 may depend on the type of data to be normalized. For example, the configuration of column normalizer logic to normalize duration data (e.g., from an accumulator counter) may be to divide such data in half (e.g., data in 30 minute intervals may be normalized to 15 minute intervals by dividing it by 2). As another example, the configuration of column normalizer logic to normalize speed data (e.g., from an intensity counter) may be to copy such data (e.g., if the average speed for a 30 minute interval is 60 miles per hour, this data can be copied to normalize it to 15 minute intervals since it can be reasonably assumed that the average speed was the same over the corresponding 15 minute intervals).

In some embodiments, column normalizer logic 224, 225, 226 may be further (or alternatively) configured to interpolate the accessed data if needed to derive missing items based on the common interval. For example, if column-a data was missing for 12:17, column-a normalizer logic 224 could interpolate the missing data based on the other column-a data for 12:02 and 12:32. In some embodiments, column normalizer logic 224, 225, 226 may be configured to interpolate the accessed data by performing at least one of linear interpolation, polynomial interpolation, logarithmic interpolation, exponential interpolation, geometric interpolation, etc. Furthermore, additional logic (not depicted) may be included in computer software architecture 200 that is configured to similarly interpolate computation results of the accessed data.

Column normalizer logic 224, 225, 226 is in communication with computation logic 236, 237, which is configured to perform one or more computations on the accessed data and output results of the computations to a storage medium (e.g., a file, database, table, etc.) or output device (e.g., a display, printer, etc.). Computations performed by computation logic 236, 237 may include one or more of various functions, such as summing, subtracting, multiplying, dividing, computing a minimum, computing a maximum, computing an average, etc. The computations may be performed on one or more outputs 230, 231, 232 of column accessor logic 218, 219, 220 and/or column normalizer logic 224, 225, 226. For example, computation logic 236 may be configured to compute the maximum of the results of the column-a data from output 230 divided by the column-b data from output 231 resulting in output 240 (e.g., max(a/b)). As another example, computation logic 237 may be configured to compute the maximum of the results of the column-a data from output 230 divided by the column-c data from output 232 (e.g., max(a/c)). As discussed above, in some embodiments, additional logic (not depicted) may be included in computer software architecture 200 that is configured to interpolate the results of computation logic 236, 237 to provide outputs 240, 241.

In some embodiments, computer software architecture 200 may include additional logic, such as logic configured to analyze the computations to be performed on the data to respond to the computation requests and/or logic configured to sort the computations into computational clusters based on their inter-computation dependencies. The additional logic may also include logic configured to identify data groups to be extracted for each computational cluster, where the data groups may include a data subset of a combination of the database tables over the computational interval, and/or logic configured to group the computations into computational groups within each computational cluster to minimize needed extractions of the data groups to perform the computations, where the table accessor logic is configured to extract the data by extracting the data groups. In some embodiments, the logic configured to group the computations into computational groups may group the computations to limit the needed extractions of the data groups to a maximum number of extractions to minimize memory usage for each computational group.

In some embodiments, table accessor logic 210, 211, column accessor logic 218, 219, 220, column normalizer logic 224, 225, 226, and/or computation logic 236, 237 may be part of a computation engine 244. This computation engine 244 may be generated by compiler logic (not depicted) based on computation information from an external source and/or extracted from one or more of the database tables. The compiler may additionally (or alternately) generate an in-memory representation that generates the computation engine 244.

Figure 3:
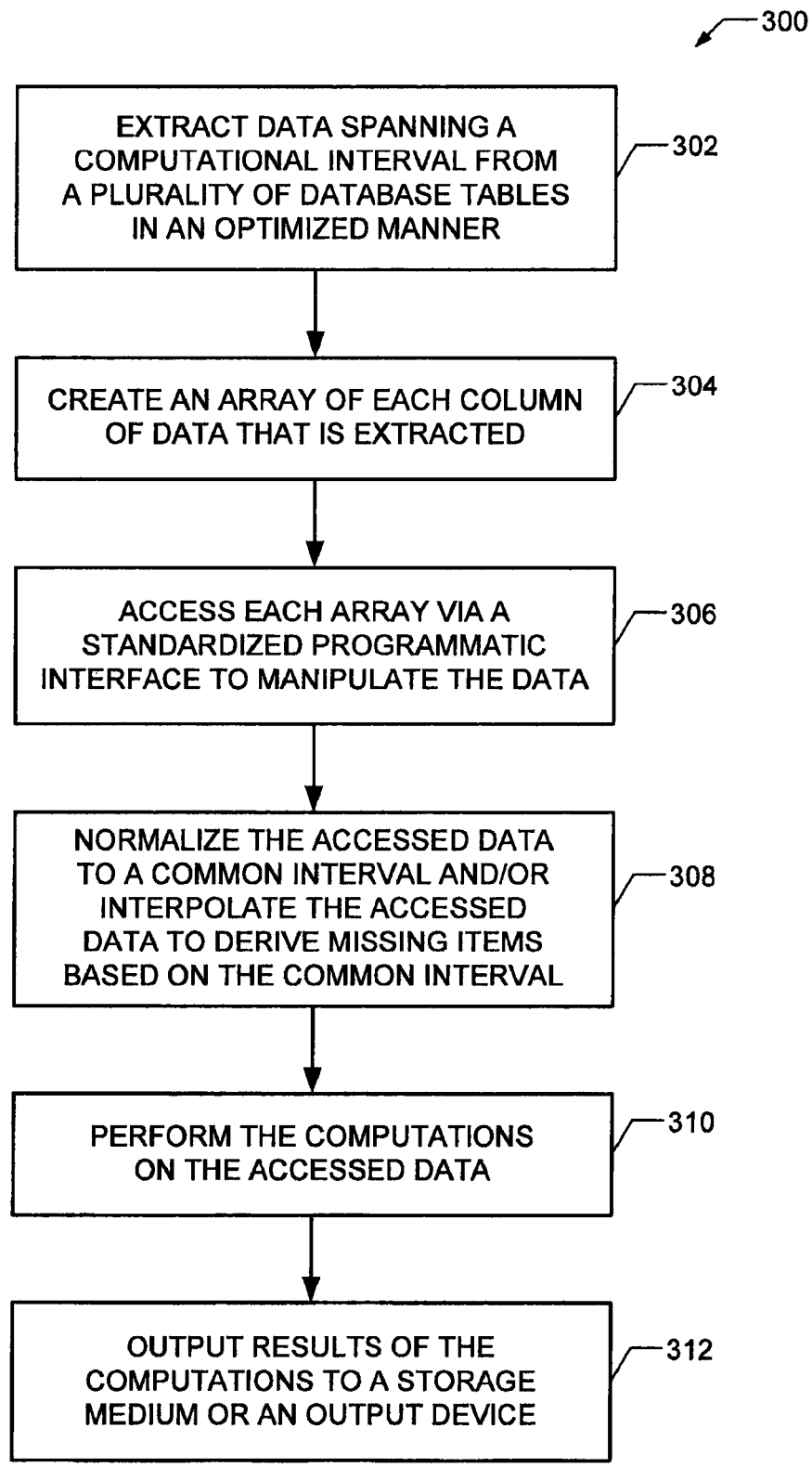
FIG. 3 is a flow diagram illustrating an example of a method to provide optimized bulk computations in data warehouse environments, which is executable, for example, on the exemplary computing device of FIG. 1.

FIG. 3 illustrates an example of a method 300 for optimized bulk computations in data warehouse environments, which is executable, for example, on the exemplary computer 102 of FIG. 1 (e.g., as a computer program product). Exemplary method 300 may also describe an exemplary operation of computer software architecture 200. In block 302, data spanning a computational interval is extracted from a plurality of database tables in an optimized manner (e.g., by table accessor logic 210, 211), such as a table scan, a partition scan, or a covering index scan (although other methods, including more complex methods, are also possible such as a SQL query). The data is extracted, e.g., to perform computations (e.g., in advance, on a routine basis, etc.) to respond to computation requests (e.g., user queries). In some embodiments, extracting data spanning a computational interval includes extracting data spanning a primary key interval and/or a time span interval. In block 304, an array of each column of data that is extracted is created (e.g., by table accessor logic 210, 211).

In block 306, each array is accessed via a standardized programmatic interface to manipulate the data (e.g., by column accessor logic 218, 219, 220). In block 308, the accessed data is normalized to a common interval if needed to perform computations (e.g., by column normalizer logic 218, 219, 220). In some embodiments, normalizing the accessed data may include performing at least one of a function of summing, subtracting, multiplying, dividing, computing a minimum, computing a maximum, or copying on the accessed data to rebase the data to a common primary key interval and/or a common time span interval.

In block 310, computations are performed on the accessed data (e.g., by computation logic 240, 241). Such computations may include one or more of various functions, such as summing, subtracting, multiplying, dividing, computing a minimum, computing a maximum, computing an average, etc. In block 312, results of the computations are output to a storage medium or an output device (e.g., by computation logic 240, 241).

In some embodiments, exemplary method 300 may also include additional blocks (not depicted) in which the computations to be performed on the data to respond to the computation requests are analyzed and/or in which the computations are sorted into computational clusters based on their inter-computation dependencies. Exemplary method 300 may also include other additional blocks (not depicted) in which data groups to be extracted for each computational cluster are identified, where the data groups may include a data subset of a combination of the database tables over the computational interval, and/or in which the computations are grouped into computational groups within each computational cluster to minimize needed extractions of the data groups to perform the computations, where the table accessor logic is configured to extract the data by extracting the data groups. In some embodiments, grouping the computations into computational groups may include grouping the computations to limit the needed extractions of the data groups to a maximum number of extractions to minimize memory usage for each computational group.

In some embodiments, one or more blocks of exemplary method 300 may be performed iteratively or recursively and one or more computations may depend on additional computations that may be similarly performed. Such recursive or iterative implementations may, e.g., aggregate data at a sub-cardinality level and then aggregate this data again at a higher cardinality, or reuse the results of a first computation to generate additional computational results. In some embodiments, two or more computational groups may be performed concurrently by performing the computations on different software fibers, threads, programs, machines, etc. as provided by the supporting software or hardware. The computational groups may be optimized to be performed concurrently by distributing the computational groups to such fibers, threads, programs, machines, etc. as provided by the operating system based on dependencies or priority ranks. Additionally, in some embodiments, complex computations needed multiple times in a computational group may be computed once and cached in order of dependency.

Exemplary computer system 100, computer 102, and computer software architecture 200 are illustrated and described with respect to various components, modules, etc. for exemplary purposes. It should be understood that other variations, combinations, or integrations of such elements that provide the same features, functions, etc. are included within the scope of embodiments of the invention.

The flowchart and/or block diagram(s) in the Figure(s) described herein illustrate the architecture, functionality, and/or operation of possible implementations of systems, methods, and/or computer program products according to various embodiments of the present invention. In this regard, each block in a flowchart or block diagram may represent a module, segment, or portion of code, which comprises one or more executable instructions for implementing the specified logical function(s). It should also be noted that, in some alternative implementations, the functions noted in a flowchart or block diagram may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in a flowchart or block diagram can be implemented by special purpose hardware-based systems that perform the specified functions or acts, or combinations of special purpose hardware and computer instructions.

The terminology used herein is for the purpose of describing exemplary embodiments and is not intended to be limiting of the present invention. As used herein, the singular forms "a", "an", and "the" are intended to include the plural forms as well, unless the context clearly indicates otherwise. It will be further understood that the terms "comprises", "comprising", "includes", or "including" when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of any means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The exemplary embodiment(s) were chosen and described in order to explain the principles of the present invention and the practical application, and to enable others of ordinary skill in the art to understand the present invention for various embodiments with various modifications as are suited to the particular use contemplated.

As will be appreciated by one skilled in the art, the present invention may be embodied as a system, method, and/or computer program product. Accordingly, the present invention may take the form of an entirely hardware embodiment, an entirely software embodiment (including firmware, resident software, micro-code, etc.), and/or or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example, but not limited to, an electronic, magnetic, optical, electromagnetic, infrared, or semiconductor system, apparatus, device, or propagation medium. More specific examples (a non-exhaustive list) of the computer-readable medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++, or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described herein with reference to flowchart illustrations and/or block diagrams of methods, apparatus (systems), and/or computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block(s).

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block(s). The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide processes for implementing the functions/acts specified in the flowchart and/or block diagram blocks.

While exemplary embodiments of the invention have been described, it will be understood that those skilled in the art, both now and in the future, may make various improvements and enhancements which fall within the scope of the claims that follow. These claims should be construed to maintain the proper protection for the invention first described.

What is claimed is:

1. A method, comprising:
    extracting data spanning a computational interval from a plurality of database tables in an optimized manner comprising one of a table scan, a partition scan, a covering index scan, or a structured query language scan, wherein the data is extracted to perform computations to respond to computation requests;
    creating an array of each column of data that is extracted;
    accessing each array via a standardized programmatic interface to manipulate the data;
    normalizing the accessed data to a common interval;
    interpolating the accessed data to derive missing items based on the common interval by performing at least one of linear interpolation, polynomial interpolation, logarithmic interpolation, exponential interpolation, or geometric interpolation;
    and
    outputting results of the computations to a storage medium or an output device.

2. The method of claim 1, wherein extracting data spanning a computational interval comprises extracting data spanning a primary key interval or a time span interval.

3. The method of claim 1, wherein normalizing the accessed data comprises performing at least one of a function of summing, subtracting, multiplying, dividing, computing a minimum, computing a maximum, or copying on the accessed data to rebase the data to a common primary key interval or a common time span interval.

4. The method of claim 1, wherein interpolating the results of the computations comprises performing at least one of linear interpolation, polynomial interpolation, logarithmic interpolation, exponential interpolation, or geometric interpolation.

5. The method of claim 1, further comprising:
- analyzing the computations to be performed on the data to respond to the computation requests;
- sorting the computations into computational clusters based on their inter-computation dependencies;
- identifying data groups to be extracted for each computational cluster, wherein the data groups comprise a data subset of a combination of the database tables over the computational interval; and
- grouping the computations into computational groups within each computational cluster to minimize needed extractions of the data groups to perform the computations;
- wherein extracting data spanning a computational interval from a plurality of database tables comprises extracting the data groups.

6. The method of claim 5, wherein grouping the computations into computational groups comprises grouping the computations to limit the needed extractions of the data groups to a maximum number of extractions to minimize memory usage for each computational group.

7. A computer program product, comprising a non-transitory computer usable medium having a computer readable program, wherein the computer readable program, when executed on a computer, causes the computer to:
- extract data spanning a computational interval from a plurality of database tables in an optimized manner comprising one of a table scan, a partition scan, a covering index scan, or a structured query language scan, wherein the data is extracted to perform computations to respond to computation requests;
- create an array of each column of data that is extracted;
- access each array via a standardized programmatic interface to manipulate the data;
- normalize the accessed data to a common interval;
- interpolate the accessed data to derive missing items based on the common interval by performing at least one of linear interpolation, polynomial interpolation, logarithmic interpolation, exponential interpolation, or geometric interpolation; and
- store results of the computations to a storage medium.

8. The computer program product of claim 7, wherein the computer extracts data spanning a computational interval by extracting data spanning a primary key interval or a time span interval.

9. The computer program product of claim 7, wherein the computer normalizes the accessed data by performing at least one of a function of summing, subtracting, multiplying, dividing, computing a minimum, computing a maximum, or copying on the accessed data to rebase the data to a common primary key interval or a common time span interval.

10. The computer program product of claim 7, wherein the computer readable program, when executed on the computer, further causes the computer to:
- analyze the computations to be performed on the data to respond to the computation requests;
- sort the computations into computational clusters based on their inter-computation dependencies;
- identify data groups to be extracted for each computational cluster, wherein the data groups comprise a data subset of a combination of the database tables over the computational interval; and
- group the computations into computational groups within each computational cluster to minimize needed extractions of the data groups to perform the computations;
- wherein the computer extracts the data by extracting the data groups.

11. The computer program product of claim 10, wherein the computer groups the computations into computational groups by grouping the computations to limit the needed extractions of the data groups to a maximum number of extractions to minimize memory usage for each computational group.

* * * * *